April 13, 1926.
M. R. DE FRANCE
BRAKE SHOE
Original Filed Oct. 12. 1921   3 Sheets-Sheet 1
1,580,657
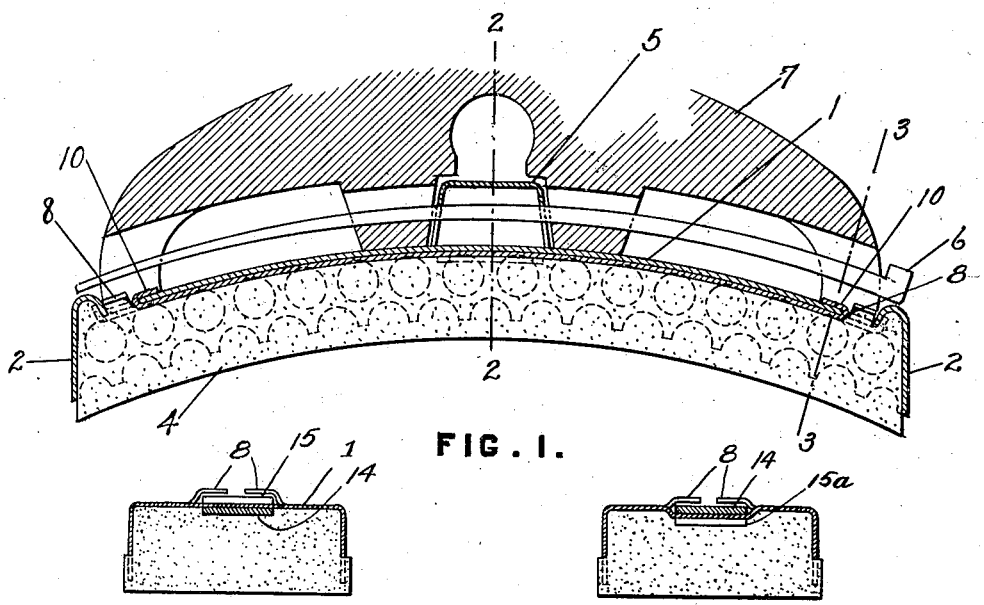
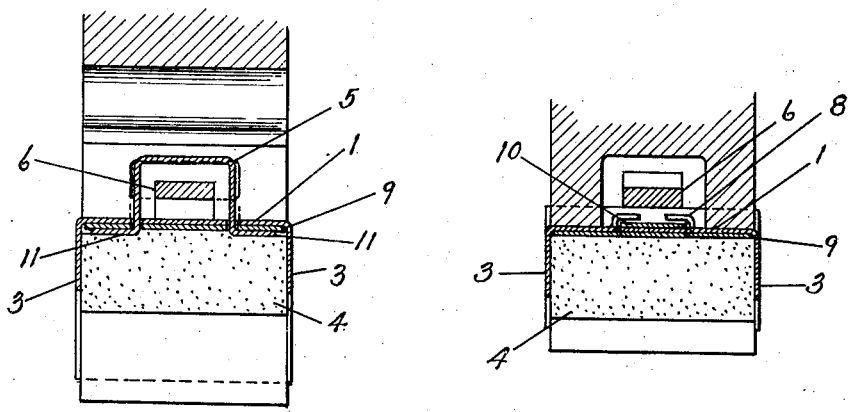
INVENTOR
Murrell R. De France
by William B. Wharton
his attorney April 13, 1926.

M. R. DE FRANCE 1,580,657

BRAKE SHOE

Original Filed Oct. 12, 1921   3 Sheets-Sheet 3

INVENTOR

Murrell R. De France by William B. Wharton his attorney

Patented Apr. 13, 1926.

1,580,657

UNITED STATES PATENT OFFICE.

MURRELL R. DE FRANCE, OF BELLEVUE, PENNSYLVANIA, ASSIGNOR, BY MESNE ASSIGNMENTS, TO THE AMERICAN BRAKE SHOE AND FOUNDRY COMPANY, OF NEW YORK, N. Y., A CORPORATION OF DELAWARE.

BRAKE SHOE.

Application filed October 12, 1921, Serial No. 507,308. Renewed September 14, 1925.

*To all whom it may concern:*

Be it known that I, MURRELL R. DE FRANCE, a citizen of the United States, and resident of Bellevue, in the county of Allegheny and State of Pennsylvania, have invented a new and useful Improvement in a Brake Shoe, of which the following is a specification.

This invention relates to a brake shoe. The brake shoe of the present invention belongs to the class of brake shoes, for use on locomotives, steam and electric railway cars, and automobiles, which comprise pressed metal shells and a filling of a suitable frictional composition.

It is highly desirable that the sides of the shell of a composition brake shoe be of light structure in order that there be no great quantity of metal to become fused during application of the brakes, as such fused metal frequently flows to the wearing face of the brake shoe and results in cutting the tread of the wheel to which the brake is applied. A brake shoe, having sides which are not only light but also reticulated to reduce the metal to a minimum is described and claimed in my prior Patent No. 1,321,897, dated November 18, 1919.

With a brake shoe of the type mentioned, comprising a shell having a thin back and sides, there is likelihood that the shoe may be pulled apart by the tangential pull of a wheel to which the brake is applied when the composition filling of the shoe has been worn thin by continued use. Various means, more or less satisfactory have been devised for strengthening the back of the brake shoe shell.

The object of the present invention is to provide a pressed metal brake shoe shell proper having relatively thin or perforated back and sides, which has a separately formed reinforcement for strengthening the back of the shell; thus securing the advantage of light sides comprising a minimum amount of metal together with the advantage of a strong and rigid back for the brake shoe shell.

Further advantages of the invention are to provide a shoe in which a separately formed reinforcement adds rigidity to the shell while requiring the use of a minimum amount of metal, and in which the means for attaching the reinforcement to the shoe are simple and such as will firmly engage the reinforcement to the shell of the brake shoe.

Figure 5:
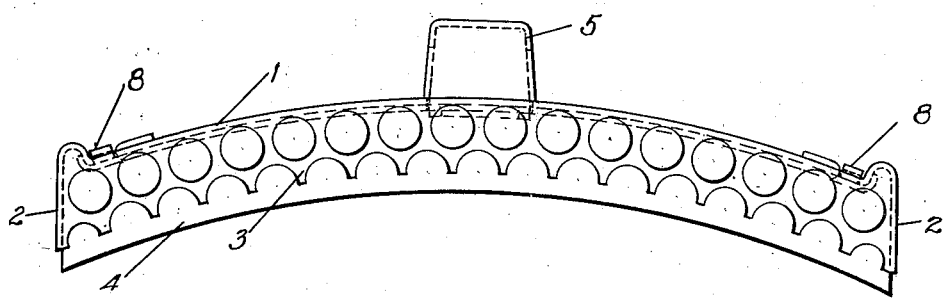
Figure 4:
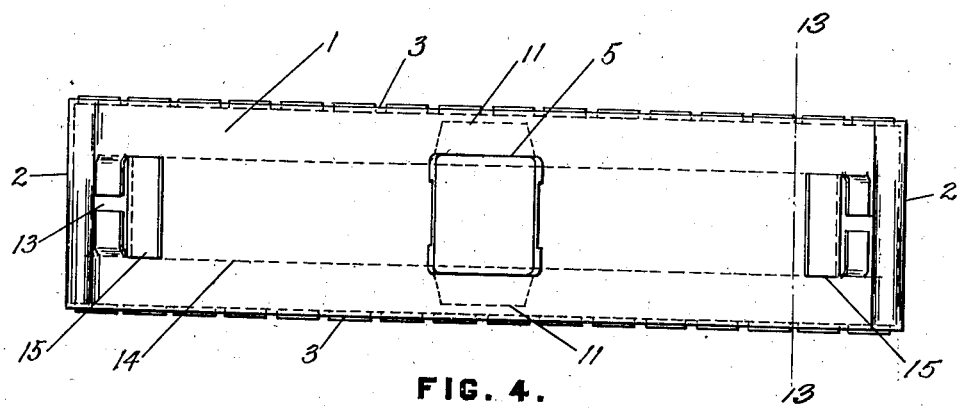
Figure 6:
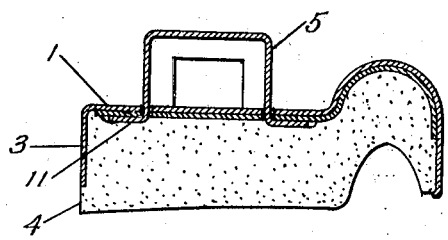
Figure 7:
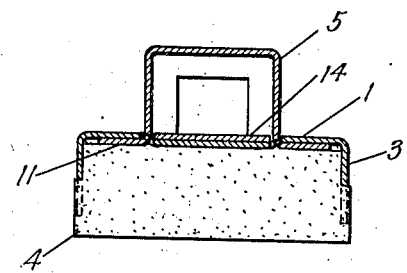
Figure 8:
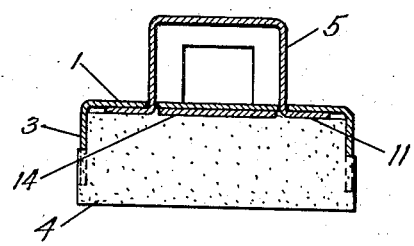
Figure 9:
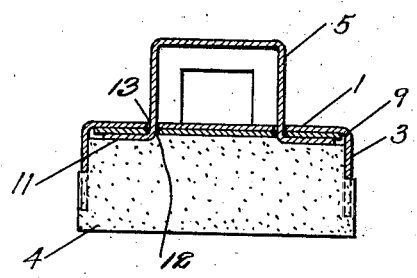
Figure 11:
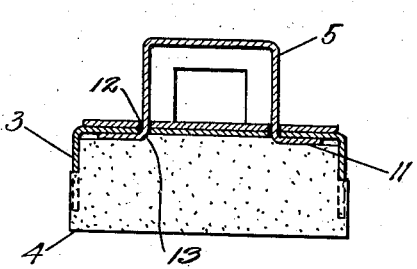
Figure 10:
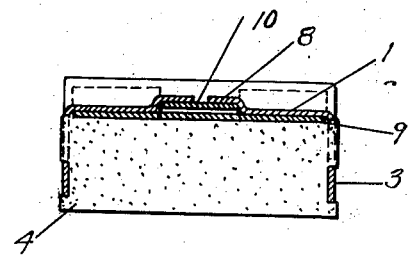
Figure 12:
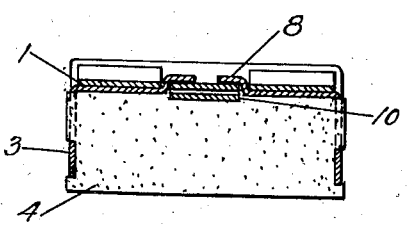

In the accompanying drawings Figure 1 is a central longitudinal section through the brake shoe of the present invention; Figure 2 is a cross sectional view on the line 2—2 Figure 1; Figure 3 is a cross sectional view on the line 3—3 Figure 1; Figure 4 is a plan view of a brake shoe shell having a reinforcing strip narrower than the one shown in the preceding figures; Figure 5 is a side elevation thereof; Figure 6 is a cross sectional view through a form of composition brake shoe arranged to embrace the rim of a railway car wheel showing the reinforcement of the present invention thereon; Figure 7 is a cross sectional view of the narrower reinforcing strip disposed on the outer surface of the brake shoe shell proper; Figure 8 is a cross sectional view showing the narrower reinforcing strip disposed on the inner side of the brake shoe shell; Figure 9 is a central cross sectional view showing the larger reinforcing strip disposed on the inner side of the brake shoe shell; Figure 10 is a cross sectional view taken adjacent the end of the shoe and illustrating the attachment of such reinforcing strip thereto; Figure 11 is a central cross sectional view showing the larger reinforcing strip disposed on the outer side of the brake shoe shell; Figure 12 is a cross sectional view taken adjacent the end of the shoe and illustrating the attachment of such reinforcing strip thereto; Figure 13 is a cross sectional view on the line 13—13 Figure 4; and Figure 14 is a cross sectional view taken on a similar line but showing a narrow reinforcing strip disposed outside the brake shoe shell, as in Figure 7.

The brake shoe of the present invention comprises primarily an integral pressed metal brake shoe shell having a back 1, ends 2, and sides 3, together with a filling 4 of a frictional composition which forms the body and wearing face of the brake shoe. To the back of this shell is secured a lug 5 for receiving a key 6 which secures the brake shoe to the brake head or hanger 7, which, as is usual, bears against the back of the brake shoe adjacent both ends thereof and which has members embracing the connecting lug 5. As shown particularly in Figure 5 of the drawings, the sides of the brake shoe shell are of thin metal reticulated and scalloped as described in my prior patent noted above, and the back of the shell is also of relatively thin metal, which may also be reticulated if so desired.

Bosses 8, which serve as guides for the fingers of the brake head are formed adjacent both ends of the back of the brake shoe shell. These bosses are formed by making two parallel cuts in the metal of the back, transversely of the shell, connecting these cuts by a single longitudinally extending cut, and pressing the tongues thus formed upwardly. The usual practice in forming brake shoes of this type is to press the filling composition into the metal shell of the shoe. When this is done a portion of the composition enters into the space under the tongues to form the bosses 8.

As so far described the brake shoe of the present invention corresponds in all substantial features with that described and claimed in Patent No. 1,321,897. The essence of the present invention, however, resides in the means for reinforcing the back of such a brake shoe. This reinforcement consists in a supplementary strip or plate of metal which may be of a greater or less width and which may be disposed either inside or outside the back of the shell, as shown in the various figures of the drawings.

The reinforcement illustrated particularly in Figures 2, 3, 9, and 10 of the drawings comprises a plate 9, which extends substantially the entire width of the brake shoe shell and which is disposed on the under or inner side of the back of the shell. Adjacent its ends the plate 9 is provided with tongues 10 formed from the metal of the plate. In attaching the reinforcing plate these tongues 10 are hooked through the space left by cutting the metal of the back of the shell to form the bosses 8, and are bent down to lie against the upper surface of the back. In order to provide space for the passage of the tongues one of the transverse cuts for each of the bosses is widened into a slot for this purpose. Obviously these tongues may, if so desired, be passed through slots cut especially for their engagement, but it is in general desirable to avoid weakening the back of the shell by making any unnecessary cuts therein.

Adjacent its central point the reinforcing plate may be additionally secured to the back of the shell by means of the lug 5 by which the brake shoe is secured to the brake head 7. This lug 5 is preferably of the form described and claimed in the application of Guy L. McIntyre, Serial No. 506,258, filed October 8, 1921. Such lug is of pressed metal and comprises tongues 11 arranged to pass through slots in the back of the brake shoe shell and engage thereunder. When this lug is employed, the plate 9 may be provided with slots 12 matching the slots 13 in the back 1 of the shell, so that the tongues 11 may pass through the reinforcing plate also.

Figures 4, 7, 8, 13, and 14 illustrate a reinforcing plate 14 narrower than that shown in the figures noted above. In Figures 4, 8, and 13 this strip is disposed on the inner side of the back 1 of the brake shoe shell. With this narrower plate the ends 15 of the plate itself may be turned to engage the back. As shown in Figures 4 and 13 these ends are passed outwardly through the orifices made in forming the bosses 8 and are clinched against the upper side of the back 1. Obviously when the narrower plate is disposed on the outer side of the back the ends 15$^a$ are passed inwardly through the boss spaces and are clinched against the inner surface of the back. When the plate lies on the outer surface of the back, as shown in Figures 7 and 14, a groove or depression is pressed into the back of the shell to receive it so that it does not project a substantial distance above the surface of the back of the shell. In this arrangement the reinforcing plate is additionally secured in position by means of the lug 5, a portion of which overlies the plate. When the plate lies on the inner side of the back, as shown in Figure 8, the filling composition renders such additional attachment unnecessary.

Figures 11 and 12 illustrate a form of the brake shoe in which the wider reinforcing plate 9 is secured to the outside of the back 1 of the brake shoe shell. In this case the tongues 10 are passed inwardly through the boss orifices and clinched against the under surface of the back. It will be seen that in this form also the lug 5 serves as an additional means for securing the plate to the back of the shell.

It will be appreciated from the foregoing that the reinforced brake shoe shell of the present invention combines the advantage of a shell having sides comprising a minimum amount of metal with one having a back of such strength that there is no likelihood that the brake shoe may be pulled apart when its body or filler is worn thin. The separately formed and attached reinforcement of this brake shoe may also be readily and economically manufactured; and this method of reinforcement permits the sides of the shell not only to be made thin but also to be reticulated and scalloped, thus further reducing the amount of metal in the wearing portion of the brake shoe.

What I claim is:

1. A brake shoe comprising a pressed metal shell having adjacent each end thereof a single slotted orifice the metal of which is pressed upwardly to form a lug on the back of the shell, a reinforcing plate having portions arranged to pass through the orifices in the back of the shell made in forming such lugs and arranged to clinch the back of the shell for securing the plate thereto, and a filling of frictional composition pressed into said shell and through the orifices in the back thereof to form keys or buttons in conjunction with the lugs formed by the displaced metal of such orifices and to lock the reinforcing plate to the back of the shell.

2. A brake shoe comprising a shell pressed from relatively thin metal and having reticulated sides, the back of said shell having adjacent each end thereof a single slotted orifice the metal of which is pressed upwardly to form a lug on the back of the shell, a reinforcing plate having portions arranged to pass through the orifices in the back of the shell made in forming such lugs and arranged to clinch the back of the shell for securing the plate thereto, and a filling of frictional composition pressed into said shell and through the orifices in the back thereof to form keys or buttons in conjunction with the lugs formed by the displaced metal of such orifices and to lock the reinforcing plate to the back of the shell.

In witness whereof, I hereunto set my hand.

MURRELL R. DE FRANCE.